(12) United States Patent
Behrens et al.

(10) Patent No.: US 11,053,027 B2
(45) Date of Patent: Jul. 6, 2021

(54) SPACE-BASED GAS SUPPLY SYSTEM

(71) Applicant: THE BOEING COMPANY, Chicago, IL (US)

(72) Inventors: John Behrens, Torrance, CA (US); Craig Alan Christy, Seal Beach, CA (US); Andrew Ian Mactavish, Palos Verdes Estates, CA (US); Kevin Nemeth, Redondo Beach, CA (US)

(73) Assignee: The Boeing Company, Chicago, IL (US)

(*) Notice: Subject to any disclaimer, the term of this patent is extended or adjusted under 35 U.S.C. 154(b) by 321 days.

(21) Appl. No.: 16/148,870

(22) Filed: Oct. 1, 2018

(65) Prior Publication Data
US 2020/0102098 A1 Apr. 2, 2020

(51) Int. Cl.
*B64G 1/10* (2006.01)
*B67D 7/02* (2010.01)
(Continued)

(52) U.S. Cl.
CPC ......... *B64G 1/1078* (2013.01); *B67D 7/0294* (2013.01); *B67D 7/36* (2013.01); *B64G 1/646* (2013.01)

(58) Field of Classification Search
CPC ...... B64G 1/1078; B64G 1/646; B64G 1/402; B64G 1/64; B64G 1/401; B64G 1/40;
(Continued)

(56) References Cited

U.S. PATENT DOCUMENTS 4,829,784 A * 5/1989 Berg ................. B64G 1/403
62/264
4,880,187 A 11/1989 Rourke et al.
(Continued)

FOREIGN PATENT DOCUMENTS

CN 107344626 A 11/2017
EP 2086836 A2 6/2008

OTHER PUBLICATIONS

British Broadcasting Corporation,"Temperature and Gas Calculations", n.d., [Retrieved on Jun. 15, 2020. Retrieved from the internet URL: https://www.bbc.co.uk/bitesize/guides/zc4xsbk/revision/2] (Year: 2020).*

*Primary Examiner* — Timothy P. Kelly
*Assistant Examiner* — Stephanie A Shrieves
(74) *Attorney, Agent, or Firm* — Armstrong Teasdale LLP

(57) ABSTRACT

A method of supplying a receiving tank of a receiving spacecraft with a supply gas. The method includes coupling a second end of a transfer line in flow communication with the receiving tank. The transfer line extends from a first end to the second end. The first end is coupled to a transfer tank disposed on a supply spacecraft. The transfer tank holds a transfer quantity of the supply gas. The supply spacecraft includes a heating system coupled in thermal communication with the transfer tank and a transfer valve operatively coupled to the transfer line. The method also includes activating the heating system while the transfer valve is closed such that a pressure of the transfer quantity of the supply gas is increased. The method further includes opening the transfer valve, wherein a difference between the increased pressure of the supply gas in the transfer tank and a pressure in the receiving tank causes a portion of the transfer quantity of the supply gas to flow through the transfer line to the receiving tank.

20 Claims, 5 Drawing Sheets

(51) Int. Cl.
*B67D 7/36* (2010.01)
*B64G 1/64* (2006.01)

(58) Field of Classification Search
CPC .......... B67D 7/36; B67D 7/0294; B67D 7/02;
B65B 1/24; B65B 1/26; B65B 63/08;
B65B 2220/24; F02K 9/44; F02K 9/42
USPC ..................................................... 141/11, 82
See application file for complete search history.

(56) References Cited

U.S. PATENT DOCUMENTS

| | | | | |
|---|---|---|---|---|
| 5,251,852 | A * | 10/1993 | Pulkowski | B64G 1/26 |
| 5,582,366 | A * | 12/1996 | Hamant | B64F 1/28 |
| | | | | 137/209 |
| 5,862,670 | A * | 1/1999 | Lak | B64G 1/007 |
| | | | | 62/48.1 |
| 8,074,935 | B2 * | 12/2011 | Gryniewski | B64G 1/1078 |
| | | | | 244/135 A |
| 2012/0000575 | A1 * | 1/2012 | Yandle | B64G 1/402 |
| | | | | 141/98 |
| 2014/0261864 | A1 * | 9/2014 | Cohen | F17C 5/06 |
| | | | | 141/4 |
| 2017/0361951 | A1 * | 12/2017 | Walker | B64G 1/402 |

\* cited by examiner

500 ⎯⬋

┌─────────────────────────────────────┐
│ Coupling a second end of a transfer line in flow
│ communication with the receiving tank. The
│ transfer line extends from a first end to the
│ second end. The first end is coupled to a transfer
│ tank disposed on a supply spacecraft. The         ⎯ 502
│ transfer tank holds a transfer quantity of the
│ supply gas. The supply spacecraft includes a
│ heating system coupled in the thermal
│ communication with the transfer tank and a
│ transfer valve operatively coupled to the transfer
│ line.
└─────────────────────────────────────┘
                    ↓
┌─────────────────────────────────────┐
│ Activating the heating system while the transfer
│ valve is closed such that a pressure of the supply  ⎯ 504
│ gas is increased.
└─────────────────────────────────────┘
                    ↓
┌─────────────────────────────────────┐
│ Opening the transfer valve. A difference between
│ the increased pressure of the supply gas in the
│ transfer tank and a pressure in the receiving tank  ⎯ 506
│ causes a portion of the transfer quantity of the
│ supply gas to flow through the transfer line to the
│ receiving tank.
└─────────────────────────────────────┘

FIG. 5

SPACE-BASED GAS SUPPLY SYSTEM

FIELD

The field of the disclosure relates generally to space-based supply systems and, more specifically, to a system and method for in-space transfer of a gaseous medium to a spacecraft.

BACKGROUND

Achievements in unmanned and autonomous technology have enabled mobile platforms, such as, for example, spacecraft, to operate for indefinite periods of time. One limitation of such a spacecraft is its finite capacity for storage. Many spacecraft utilize an onboard supply of a gas, such as, for example, a propellant, that is depleted over time of operation until the spacecraft is required to be re-supplied in order to continue in operation. In one example, at least some spacecraft incorporate electric propulsion, or ion drives, onboard the spacecraft to maintain or adjust a trajectory of the spacecraft through space. The electric propulsion drive creates thrust by accelerating positive ions with electricity. The positives ions, which may be obtained from a gas such as xenon, are depleted and the gas requires replenishment in order to extend the mission of the spacecraft. In-space resupply of the spacecraft is an effective method of extending the mission of the spacecraft.

One known method of in-space gas resupply includes coupling a supply tank to the spacecraft receiving tank. The supply tank has a pressure that is greater than a pressure of the receiving tank. A series of valves are then opened such that the pressures in the supply tank and the receiving tank equalize, transferring gas from the higher pressure supply tank to the lower pressure receiving tank. However, this method can only transfer gas until the pressures within the two tanks are equalized. As such, a substantial amount of gas remains in the supply tank, rendering the resupply process relatively inefficient.

Moreover, at least some known methods of in-space resupply of a spacecraft use electro-mechanical rotating equipment, such as, for example, pumps or compressors, to increase an amount of gas that may be transferred from the supply tank to the receiving tank. However, such transfer systems typically require a high degree of redundancy and maintenance for components of the pumps and compressors, increasing a weight and launch cost of the supply system and thus reducing an overall efficiency of the transfer process.

BRIEF DESCRIPTION

One aspect of the present disclosure includes a method of supplying a receiving tank of a receiving spacecraft with a supply gas. The method includes coupling a second end of a transfer line in flow communication with the receiving tank. The transfer line extends from a first end to the second end. The first end is coupled to a transfer tank disposed on a supply spacecraft. The transfer tank holds a transfer quantity of the supply gas. The supply spacecraft includes a heating system coupled in thermal communication with the transfer tank and a transfer valve operatively coupled to the transfer line. The method also includes activating the heating system while the transfer valve is closed such that a pressure of the transfer quantity of the supply gas is increased. The method further includes opening the transfer valve, wherein a difference between the increased pressure of the supply gas in the transfer tank and a pressure in the receiving tank causes a portion of the transfer quantity of the supply gas to flow through the transfer line to the receiving tank.

Another aspect of the present disclosure includes a transfer system for supplying a receiving tank of a receiving spacecraft with a supply gas from a supply spacecraft. The system includes a transfer tank, a transfer line, a transfer valve, a heating system, and a control system. The transfer tank is disposed on the supply spacecraft and configured to retain a supply gas. The transfer line extends from a first end to a second end. The first end is coupled to the transfer tank, and the second end is configured to be coupled in flow communication with the receiving tank. The transfer valve is operatively coupled to the transfer line. The heating system is coupled in thermal communication with the transfer tank. The control system is operatively coupled to the transfer valve and the heating system. The control system is operable to activate the heating system while maintaining the transfer valve closed such that a pressure of a transfer quantity of the supply gas in the transfer tank is increased. The control system is also operable to open the transfer valve, such that a difference between the increased pressure of the supply gas in the transfer tank and a pressure in the receiving tank causes a portion of the transfer quantity of the supply gas to flow through the transfer line to the receiving tank.

Yet another aspect of the present disclosure includes supply spacecraft including a transfer tank, a transfer line, a transfer valve, a heating system, and a control system. The transfer tank is configured to retain a supply gas. The transfer line is coupled in flow communication with the transfer tank and is configured to be coupled in flow communication with a receiving tank. The transfer valve is configured to selectively allow flow through the transfer line. The heating system is coupled in thermal communication with the transfer tank. The control system is operatively coupled to the transfer valve and the heating system. The control system is operable to activate the heating system while the transfer valve is closed such that a pressure of the supply gas in the transfer tank is increased. The control system is further operable to open the transfer valve such that a difference between the increased pressure of the supply gas in the transfer tank and a pressure in the receiving tank causes a portion of the transfer quantity of the supply gas to flow through the transfer line to the receiving tank.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 5 is a flow diagram of an embodiment of a method of supplying a receiving tank of a spacecraft from a space-based supply system.

Figure 1:
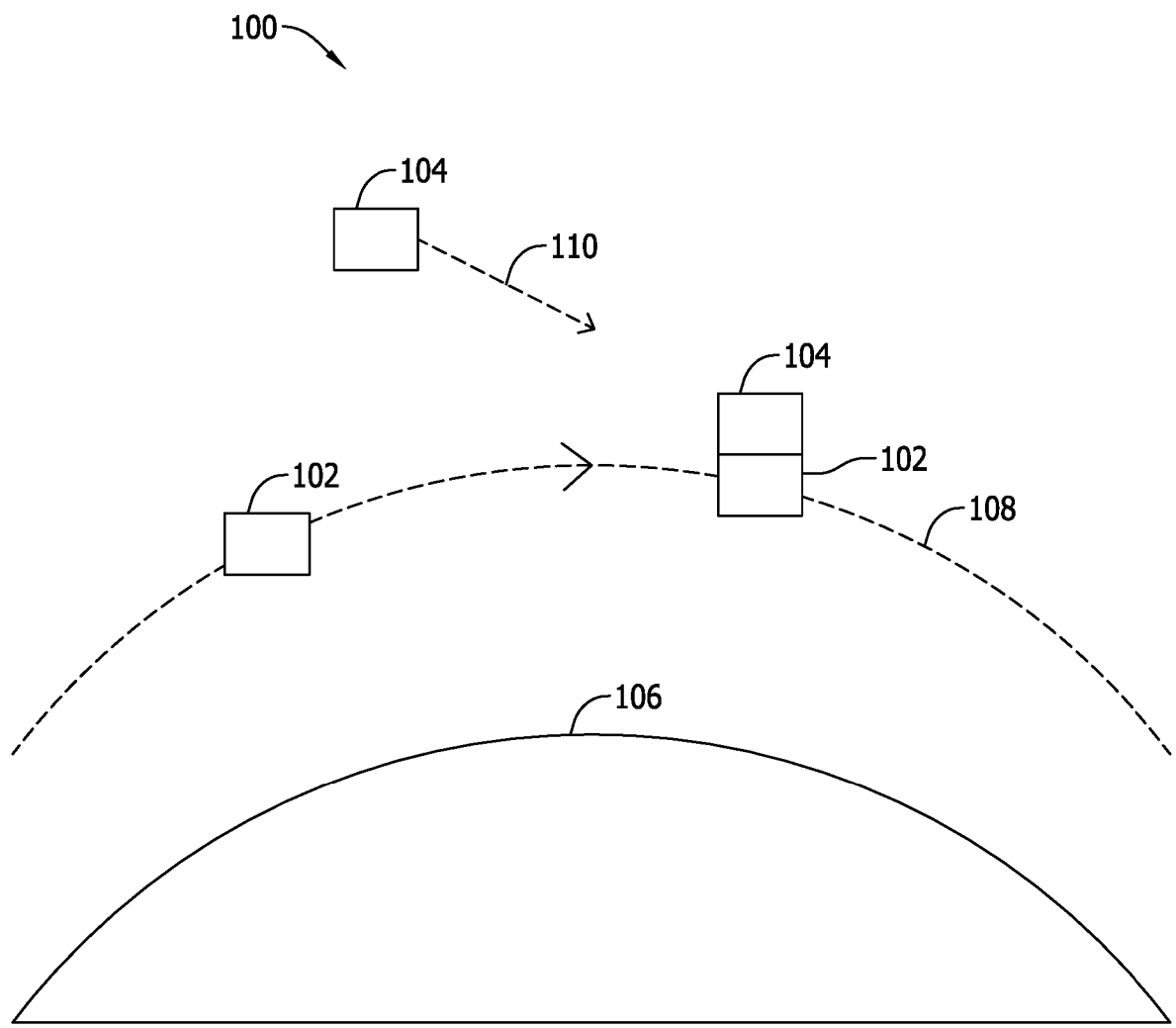
FIG. 1 is a schematic diagram of an embodiment of a space-based supply system for supplying a spacecraft.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of the systems described herein include a supply spacecraft for replenishing a gas supply of a receiving spacecraft in space. The supply spacecraft includes a transfer system configured to transfer a supply gas from the supply spacecraft to the receiving spacecraft using a limited amount of electro-mechanical equipment, thus reducing maintenance and redundancy requirements for the supply spacecraft. For example, the transfer system requires no rotating mechanical pumps or compressors. In a first implementation, the transfer system includes a transfer tank and a heating system that selectively heats the transfer tank, such that the heated supply gas is forced from the transfer tank into the receiving tank. In some such implementations, the transfer system also includes a cooling system that cools the transfer tank such that another quantity of supply gas is drawn from a supply tank into the transfer tank, for supply to the receiving tank in a subsequent heating cycle. In a second implementation, the transfer system includes a working gas system and a variable volume transfer tank. The variable volume transfer tank includes a variable volume element that subdivides the tank into a working gas volume and a supply gas volume. The working gas system increases the pressure in the working gas volume of the transfer tank, causing the internal element to push supply gas from the supply gas side into the receiving tank. Specifically, the working gas system channels high pressure working gas into the working gas volume of the transfer tank, causing the variable volume element to force the supply gas out of the transfer tank into the receiving tank. In some such implementations, the internal movable element is a bellows, and the working gas system is vented to lower pressure to allow the bellows to cyclically receive the higher pressure supply gas from a supply tank into the supply gas volume of the transfer tank, before pushing the supply gas out to the receiving tank by using the working gas to increase pressure in the transfer tank. In other such implementations, the variable volume element is a bladder and the variable volume transfer tank is sized to resupply the receiving tank in a single sustained push of the bladder by the working gas system. In a third implementation, the thermal transfer system is used in combination with the variable volume transfer tank to further increase the efficiency of the transfer process, especially when the transfer tank is smaller than the supply tank and receiving tank. Each of the above described implementations transfers a supply gas from the supply spacecraft to the receiving spacecraft beyond an amount possible using simple tank pressure equalization, and does so without using rotating electro-mechanical equipment, such as pumps or compressors, thereby avoiding associated requirements for maintenance and redundancy.

FIG. 1 is a schematic diagram of an embodiment of a space-based gas supply transfer environment 100. Environment 100 includes a receiving spacecraft 102 and a supply spacecraft 104. In the implementation of FIG. 1, receiving spacecraft 102 and supply spacecraft 104 are each depicted as satellites in orbit around a gravity well 106, such as the Earth or Earth's Moon. As used herein the term "spacecraft" includes any of a spacecraft on a dedicated trajectory, an orbital station in a fixed orbit, or any other vehicle or platform operating in a low-gravity environment (e.g., outer space). In the illustrated embodiment, receiving spacecraft 102 is in stable orbit around gravity well 106 as illustrated by a dashed line 108 indicating the orbital path of receiving spacecraft 102. Supply spacecraft 104 is on a dedicated trajectory, as illustrated by dashed line 110, to rendezvous with receiving spacecraft 102. Receiving spacecraft 102 requires resupply of a supply gas in order to continue its mission. As such, supply spacecraft 104 moves into close proximity to receiving spacecraft 102 such that both receiving spacecraft 102 and supply spacecraft 104 are now on a substantially identical trajectory and supply spacecraft 104 can resupply receiving spacecraft 102.

Figure 2:
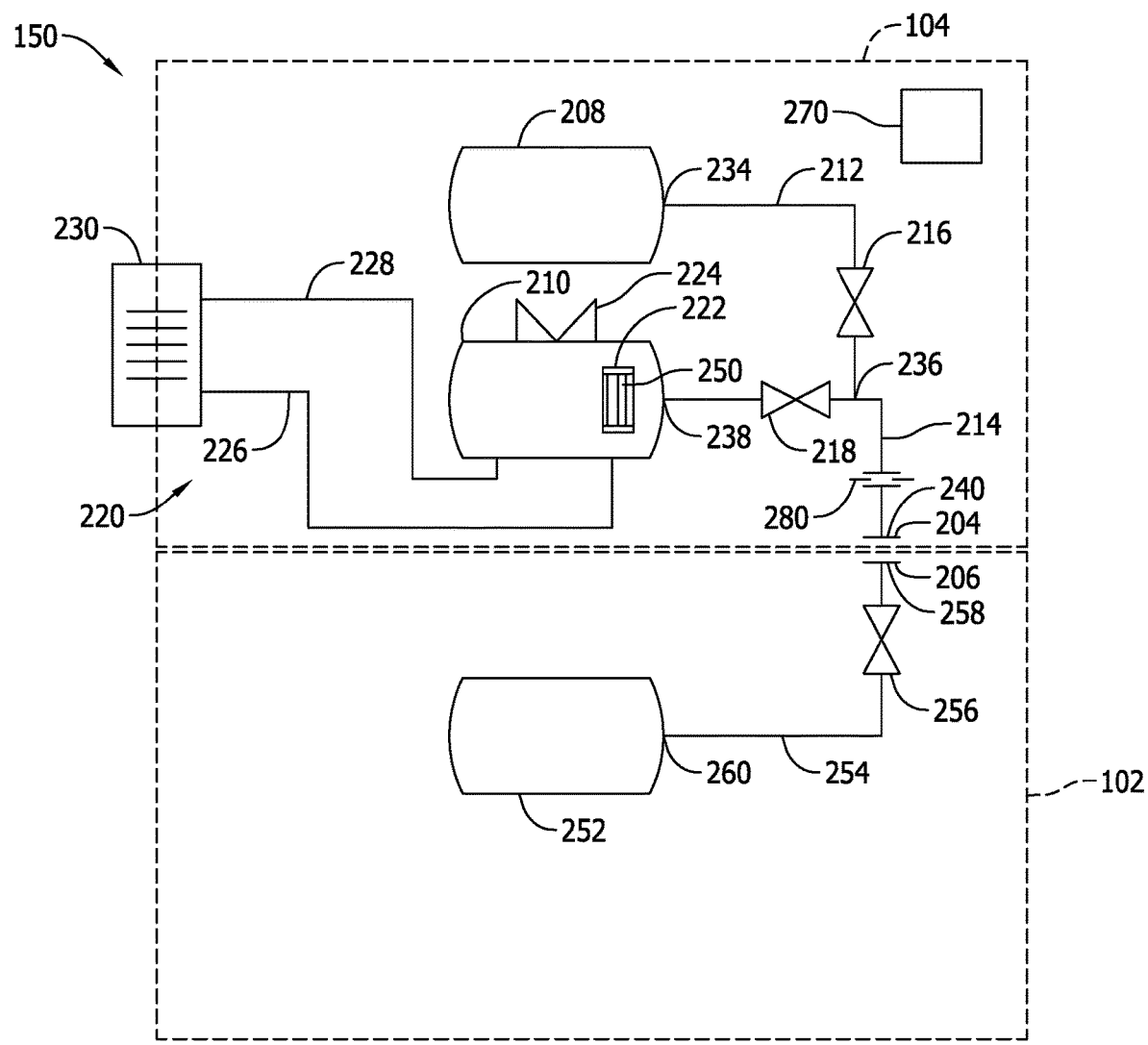
FIG. 2 is a schematic diagram of a thermal compressor system for use in the space-based supply system shown in FIG. 1.

FIG. 2 is a schematic diagram of a first embodiment of a transfer system 150 carried on supply spacecraft 104 for use in supplying gas to a receiving tank 252 of receiving spacecraft 102. A supply spacecraft interface 204 is disposed on supply spacecraft 104 and suitably configured to attach to a receiving spacecraft interface 206 disposed on receiving spacecraft 102. Specifically, supply spacecraft interface 204 and receiving spacecraft interface 206 are configured to couple transfer system 150 and receiving tank 252 in flow communication in any suitable fashion that enables transfer system 150 to function as described herein.

In the example implementation, receiving spacecraft 102 includes a receiving line 254 in flow communication between receiving tank 252 and receiving spacecraft interface 206. More specifically, receiving line 254 includes a first end 258 coupled in flow communication with receiving spacecraft interface 206 and a second end 260 coupled in flow communication with receiving tank 252. A receiving valve 256 is operatively coupled to receiving line 254 to enable and disable a flow of supply gas from receiving spacecraft interface 206 to receiving tank 252. In the example implementation, receiving valve 256 is a normally closed solenoid valve. Alternatively, receiving valve 256 may be any type of valve that enables receiving tank 252 to operate as described herein.

In the example embodiment, transfer system 150 includes a transfer tank 210, a transfer line 214, a transfer valve 218, and a control system 270. Transfer tank 210 is configured to retain a supply gas. The supply gas may be any gas desired for transfer from supply spacecraft 104 to receiving spacecraft 102 including, without limitation, oxygen, nitrogen, helium, or a propellant such as xenon. Transfer line 214 includes a first end 238 coupled in flow communication with transfer tank 210 and a second end 240 coupled in flow communication with supply spacecraft interface 204. Transfer valve 218 is operatively coupled to transfer line 214 and is selectively operable to enable and disable a flow of supply gas through transfer line 214 from transfer tank 210 to supply spacecraft interface 204. In the example implementation, transfer valve 218 is a normally closed solenoid valve controllable via control system 270. Alternatively, transfer valve 218 may be any type of valve that enables transfer system 150 to operate as described herein.

In the example implementation, transfer system 150 also includes a heating system 222 coupled in thermal communication with transfer tank 210. More specifically, heating system 222 is selectively activatable by control system 270 to heat transfer tank 210 and/or the contents of transfer tank 210, specifically the supply gas contained within transfer tank 210. For example, heating system 222 includes an electric heater 250 having coils wrapped around transfer tank 210. Alternatively, heating system 222 includes any type of heat generation device and/or is positioned at any location on supply spacecraft 104 that enables heating system 222 to operate as described herein.

In operation, supply spacecraft interface 204 and receiving spacecraft interface 206 couple together such that transfer line 214 and receiving line 254 are in flow communication. Transfer tank 210 contains a transfer quantity of supply gas initially at a first pressure. Transfer valve 218 is initially closed. Control system 270 is programmed to activate heating system 222 while maintaining transfer valve 218 closed, such that the pressure of the transfer quantity of supply gas in transfer tank 210 is increased to a second pressure (by heating of the supply gas at a substantially constant volume).

Receiving tank 252 is initially at a receiving pressure less than the second pressure. For example, receiving tank 252 is relatively depleted such that the second pressure is greater than the receiving pressure. Receiving valve 256 is opened, such as via a control system (not shown) on-board receiving spacecraft 102 that is in wireless communication with control system 270 and/or with a ground-based control system. In addition, control system 270 is programmed to open transfer valve 218, for example in response to the pressure in transfer tank 210 reaching the second pressure. The higher second pressure in transfer tank 210 causes a portion of the transfer quantity of supply gas to flow from transfer tank 210, through transfer line 214 and receiving line 254, into receiving tank 252. Transfer valve 218 and receiving valve 256 are closed after the supply pressure and the receiving pressure are equalized. Due to the action of heating system 222, the second pressure is much higher than a supply pressure in a comparable resupply process from an unheated transfer tank, resulting in the transfer of a correspondingly greater proportion of the supply gas to receiving tank 252.

In some implementations, transfer system 150 further includes a supply tank 208 also configured to retain the supply gas, and a cooling system 220 operable by control system 270 to cool transfer tank 210 and/or the contents of transfer tank 210 such that another quantity of supply gas is drawn from a supply tank 208 into transfer tank 210, for supply to receiving tank 252 in a subsequent heating cycle. In the example embodiment, supply tank 208 has a relatively large volume as compared to transfer tank 210. For example, the relatively smaller volume of transfer tank 210 enables heating of successive quantities of supply gas within transfer tank 210 in a more efficient process than heating all of the supply gas simultaneously within supply tank 208.

In the example implementation, supply tank 208 is coupled in flow communication with transfer tank 210 and supply spacecraft interface 204 by a supply line 212. More specifically, supply line 212 includes a first end 234 coupled in flow communication with supply tank 208 and a second end 236 coupled in flow communication with transfer line 214 downstream from transfer valve 218. A supply valve 216 is operatively coupled to supply line 212 and is selectively operable to enable and disable a flow of supply gas from supply tank 208. In the example implementation, supply valve 216 is a normally closed solenoid valve controllable via control system 270. Alternatively, supply valve 216 may be any type of valve that enables transfer system 150 to operate as described herein.

In the example implementation, cooling system 220 is a radiative cooling system that includes a tank heat exchanger 224, a coolant supply line 226, a coolant return line 228, and a heat rejection heat exchanger 230 adjacent to an outer surface of supply spacecraft 104, such that heat is rejected to space from the supply gas that remains within transfer tank 210, for example after a heating and transfer cycle to receiving tank 252. Alternatively, cooling system 220 includes any system configured to cool transfer tank 210 and/or the contents of transfer tank 210.

Optionally, any of supply line 212, transfer line 214, and/or receiving line 254 may include an orifice plate 280 within supply line 212, transfer line 214, and/or receiving line 254. Orifice plate 280 may be part of a flow meter or may be a standalone fitting within supply line 212, transfer line 214, and/or receiving line 254. If orifice plate 280 is a standalone fitting within supply line 212, transfer line 214, and/or receiving line 254, it is configured to reduce the pressure of a flow of supply gas and/or restrict the flow of a flow of supply gas. Orifice plate 280 is a plate within an orifice disposed within supply line 212, transfer line 214, and/or receiving line 254. The diameter of the orifice is less than a diameter of supply line 212, transfer line 214, and/or receiving line 254 such that the pressure of a flow of supply gas is reduced and/or the flow of a flow of supply gas is restricted. While orifice plate 280 is illustrated as positioned within transfer line 214, it may also be positioned within supply line 212 and/or receiving line 254. Additionally, any of supply line 212, transfer line 214, and/or receiving line 254 may include a pre-orifice heater (not shown) upstream of orifice plate 280 and/or a post-orifice plate heater (not shown) downstream of orifice plate 280 configured to heat the flow of supply gas either before or after restriction by orifice plate 280.

In operation of embodiments including supply tank 208 and cooling system 220, the supply gas is provided to receiving tank 252 in a two-phase process. Supply spacecraft interface 204 and receiving spacecraft interface 206 couple together such that transfer line 214 and receiving line 254 are in flow communication. Supply tank 208 contains a supply quantity of supply gas at a supply pressure and receiving tank 252 is at the receiving pressure. For example, receiving tank 252 is relatively depleted such that the supply pressure is greater than the receiving pressure. Receiving valve 256 is opened, such as via a control system (not shown) on-board receiving spacecraft 102 that is in wireless communication with control system 270 and/or with a ground-based control system. In the first phase, control system 270 is programmed to open supply valve 216 such that supply tank 208 and receiving tank 252 are coupled directly in flow communication, while maintaining transfer valve 218 closed. The higher supply pressure causes a flow of supply gas to flow from supply tank 208 through supply line 212, transfer line 214, and receiving line 254 to receiving tank 252. Supply valve 216 and receiving valve 256 are maintained open until the supply pressure and the receiving pressure are equalized.

Once the supply pressure and the receiving pressure are equalized, control system 270 is programmed to close receiving valve 256 and supply valve 216, and the second phase begins. A residual supply pressure remains in supply tank 208. In the example implementation, control system 270 is programmed to cool transfer tank 210 while maintaining transfer valve 218 closed, such that the pressure in transfer tank 210 is decreased to a third pressure (by cooling of an initial quantity of the supply gas in transfer tank 210 at a substantially constant volume) that is less than the residual supply pressure. Control system 270 is programmed to then open supply valve 216 and transfer valve 218, for example in response to the pressure in transfer tank 210 reaching the third pressure. The higher residual pressure in supply tank 208 causes supply gas to flow from supply tank 208 through supply line 212 and transfer line 214 to transfer tank 210, such that another transfer quantity of supply gas is retained in transfer tank 210. Transfer valve 218 and supply valve 216 are then closed, and control system 270 then implements a heating cycle to increase the supply gas pressure to the second pressure, as described above, and a transfer cycle to receiving tank 252, also as described above. In the second phase, successive cooling and heating/transfer cycles may be repeated any number of times until the residual supply pressure in supply tank 208 is equal to or less than the lowest third pressure in transfer tank 210 that is achievable by cooling system 220.

In alternative embodiments including supply tank 208 and cooling system 220, the operations described above with respect to the first phase are omitted, and the supply gas is provided to receiving tank 252 using solely one or more cycles of the second phase process.

Transfer system 150 thus transfers supply gas from supply spacecraft 104 to receiving spacecraft 102 without requiring a use of electromechanical rotating equipment, such as compressors or pumps, that would require regular maintenance and/or significantly weight-increasing component redundancy to ensure operation in space. Because supply spacecraft 104 and receiving spacecraft 102 operate in outer space, beyond the easy reach of maintenance personnel and systems, a substantially maintenance free system, such as transfer system 150, ensures that supply spacecraft 104 can supply receiving spacecraft 102 reliably and at relatively low cost, and the reduced need for redundancy correspondingly reduces a weight of the supply spacecraft at launch.

Figure 3:
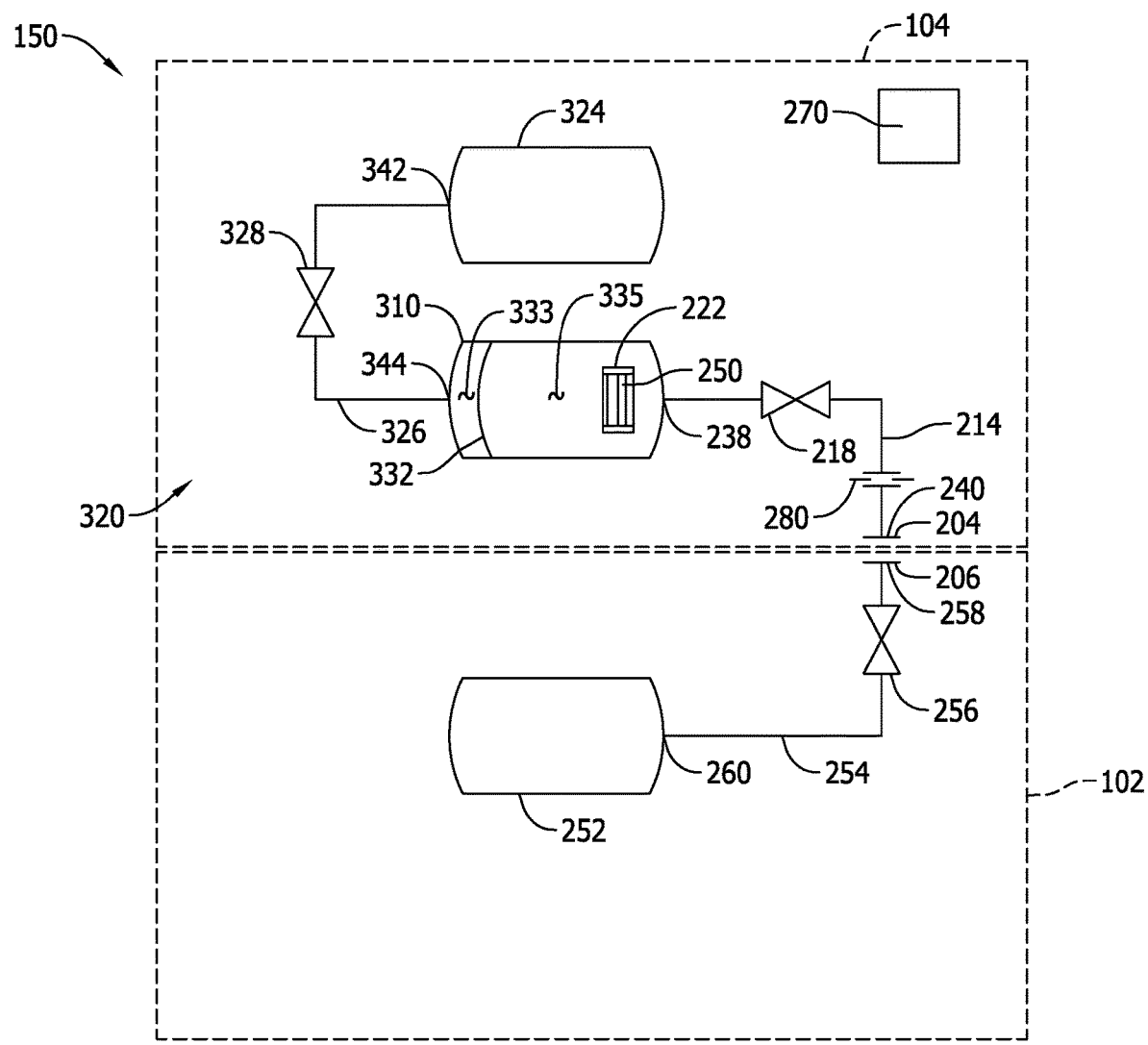
FIG. 3 is a schematic diagram of a bladder tank positive expulsion system for use in the space-based supply system shown in FIG. 1.

FIG. 3 is a schematic diagram of a second embodiment of transfer system 150. In the example implementation, transfer system 150 includes a variable volume transfer tank 310 and a working gas system 320. Transfer tank 310 is a variable volume tank configured to selectively change the working volume within transfer tank 310. Specifically, transfer tank 310 includes a variable volume element 332. In the illustrated implementation, variable volume element 332 is a flexible bladder configured to contain the transfer quantity of supply gas. As described below, a volume of variable volume element 332 is configured to change, increasing a pressure within variable volume element 332 and channeling supply gas out of transfer tank 310. Specifically, variable volume element 332 separates transfer tank 310 into a first variable volume 333, defined within variable volume element 332, and a second variable volume 335, defined by a remaining volume of transfer tank 310 outside variable volume element 332. First variable volume 333 is configured to retain the transfer quantity of supply gas. Second variable volume 335 is configured to receive a working gas.

Working gas system 320 includes any system configured to increase the pressure within second variable volume 335 of transfer tank 310. In the example implementation, working gas system 320 includes a working gas tank 324, a working gas supply line 326, and a working gas valve 328. In the example implementation, working gas tank 324 is configured to retain a quantity of working gas at a high working gas pressure. Working gas tank 324 is coupled in flow communication with the second variable volume 335 of transfer tank 310 by working gas supply line 326. Working gas supply line 326 includes a first end 342 coupled in flow communication with working gas tank 324 and a second end 344 coupled in flow communication with transfer tank 310. Working gas valve 328 is operatively coupled to working gas supply line 326 to enable and disable a flow of working gas from working gas tank 324 to second variable volume 335 of transfer tank 310. In the example implementation, working gas valve 328 is a normally closed solenoid valve controllable via control system 270. Alternatively, working gas valve 328 may be any type of valve that enables transfer system 150 to operate as described herein.

In operation, supply spacecraft interface 204 and receiving spacecraft interface 206 couple together such that transfer line 214 and receiving line 254 are in flow communication. First variable volume 333 of transfer tank 310 is initially at a first pressure. Transfer valve 218 is initially closed. Control system 270 is programmed to activate working gas system 320, such that the pressure of the quantity of supply gas in first variable volume 333 of transfer tank 310 is increased to a second pressure with the working gas volume pressurized. Specifically, control system 270 opens working gas valve 328 such that working gas tank 324 is in flow communication with second variable volume 335 of transfer tank 310. Working gas tank 324 contains a quantity of working gas at a high working gas pressure that is greater than the first pressure. A flow of working gas flows into second variable volume 335 of transfer tank 310, increasing the pressure within second variable volume 335 of transfer tank 310. Increasing the pressure within second variable volume 335 of transfer tank 310 compresses variable volume element 332 and correspondingly increases the pressure in first variable volume 333 of transfer tank 310.

Receiving tank 252 is initially at a receiving pressure less than the second pressure. For example, receiving tank 252 is relatively depleted such that the second pressure is greater than the receiving pressure. Receiving valve 256 is opened, such as via a control system (not shown) on-board receiving spacecraft 102 that is in wireless communication with control system 270 and/or with a ground-based control system. In addition, control system 270 is programmed to open transfer valve 218, for example in response to the pressure in first variable volume 333 of transfer tank 310 reaching the second pressure. The higher second pressure in first variable volume 333 of transfer tank 310 causes a portion of the transfer quantity of the supply gas to flow from first variable volume 333 of transfer tank 310, through transfer line 214 and receiving line 254, and into receiving tank 252. Transfer valve 218 and receiving valve 256 are closed after the supply pressure and the receiving pressure are equalized.

In some implementations, transfer system 150 further includes heating system 222 operable by control system 270 as described above to heat first variable volume 333 of transfer tank 310 and/or the contents first variable volume 333 of transfer tank 310 such that the pressure of the quantity of supply gas within first variable volume 333 of transfer tank 310 is further increased to a greater second pressure and/or increased to the second pressure more efficiently, thereby further increasing the overall efficiency of the transfer process.

Transfer system 150 thus transfers supply gas from supply spacecraft 104 to receiving spacecraft 102 without requiring a use of electromechanical rotating equipment, such as compressors or pumps, that would require regular maintenance and/or significantly weight-increasing component redundancy to ensure operation in space. Because supply spacecraft 104 and receiving spacecraft 102 operate in outer space, beyond the easy reach of maintenance personnel and systems, a substantially maintenance free system, such as transfer system 150, ensures that supply spacecraft 104 can supply receiving spacecraft 102 reliably and at relatively low cost, and the reduced need for redundancy correspondingly reduces a weight of the supply spacecraft at launch.

Figure 4:
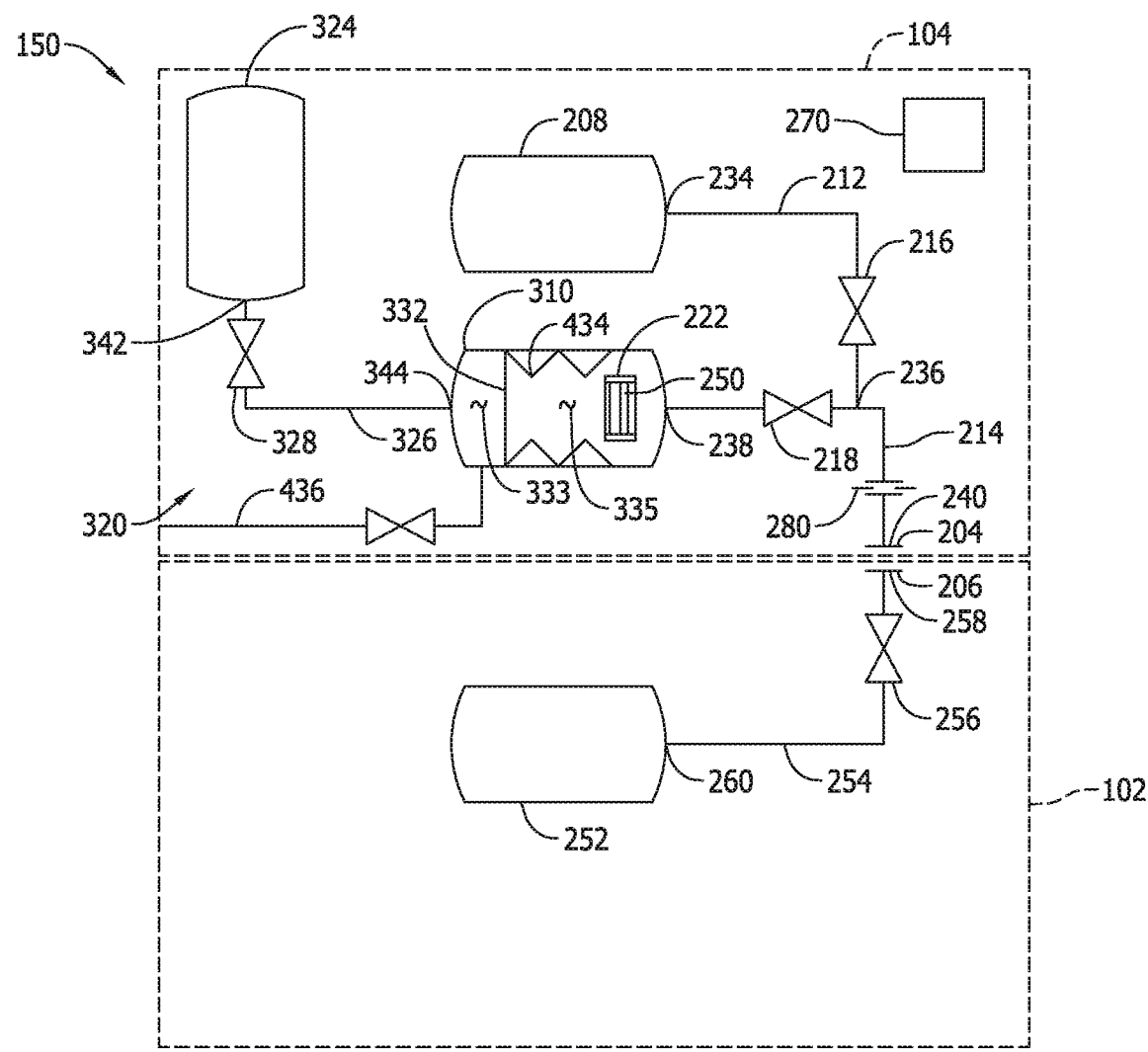
FIG. 4 is a schematic diagram of a bellows tank positive expulsion system for use in the space-based supply system shown in FIG. 1.

FIG. 4 is a schematic diagram of a third embodiment of transfer system 150. In the example implementation, transfer system 150 includes variable volume transfer tank 310, working gas system 320, and supply tank 208. As described above with respect to FIG. 3, variable volume element 332 separates transfer tank 310 into first variable volume 333, defined within variable volume element 332, and into second variable volume 335, defined by the remaining volume of transfer tank 310 outside variable volume element 332. First variable volume 333 is again configured to retain the transfer quantity of supply gas, and second variable volume 335 is again configured to retain a quantity of working gas. However, in the illustrated implementation, variable volume element 332 is a flexible bellows 434, and transfer system 150 further includes a vent 436 in flow communication with second variable volume 335 of variable volume transfer tank 310. Vent 436 is controllable via control system 270 to selectively vent second variable volume 335 to ambient (i.e., to outer space).

In operation of embodiments including bellows and supply tank 208, the supply gas is provided to receiving tank 252 in a two-phase process. Supply spacecraft interface 204 and receiving spacecraft interface 206 couple together such that transfer line 214 and receiving line 254 are in flow communication. Supply tank 208 contains a supply quantity of supply gas at a supply pressure and receiving tank 252 is at the receiving pressure. For example, receiving tank 252 is relatively depleted such that the supply pressure is greater than the receiving pressure. Receiving valve 256 is opened, such as via a control system (not shown) on-board receiving spacecraft 102 that is in wireless communication with control system 270 and/or with a ground-based control system. In the first phase, control system 270 is programmed to open supply valve 216 such that supply tank 208 and receiving tank 252 are coupled directly in flow communication, while maintaining transfer valve 218 closed. The higher supply pressure causes a flow of supply gas to flow from supply tank 208 through supply line 212, transfer line 214, and receiving line 254 to receiving tank 252. Supply valve 216 and receiving valve 256 are maintained open until the supply pressure and the receiving pressure are equalized.

Once the supply pressure and the receiving pressure are equalized, control system 270 is programmed to close receiving valve 256, and the second phase begins. A residual supply pressure remains in supply tank 208 and first variable volume 333 of transfer tank 310 holds an initial quantity of supply gas at an initial pressure. In the example implementation, control system 270 is programmed to open transfer valve 218 and vent 436 while maintaining working gas valve 328 closed and supply valve 216 open. Second variable volume 335 of transfer tank 310 vents to the near-vacuum of outer space, moving the bellows 434 into an expanded volume condition. As the volume within bellows 434 increases and pressure drops, a portion of the higher pressure supply quantity of supply gas flows from supply tank 208, through supply line 212 and transfer line 214, and into first variable volume 333 of transfer tank 310, such that another transfer quantity of supply gas is retained in transfer tank 210. Control system 270 then closes vent 436 and supply valve 216. The transfer quantity of supply gas in first variable volume 333 of transfer tank 310 is at a first pressure. Control system 270 then activates working gas system 320, such that the pressure of the transfer quantity of supply gas in first variable volume 333 of transfer tank 310 is increased to a second pressure as described above with respect to FIG. 3. Specifically, control system 270 opens working gas valve 328 such that working gas tank 324 is in flow communication with second variable volume 335 of transfer tank 310. Working gas tank 324 contains a quantity of working gas at a high working gas pressure that is greater than the first pressure. A flow of working gas flows into second variable volume 335 of transfer tank 310, increasing the pressure within second variable volume 335 of transfer tank 310. Increasing the pressure within second variable volume 335 of transfer tank 310 compresses bellows 434, and correspondingly increases the pressure in first variable volume 333 of transfer tank 310.

Receiving tank 252 is initially at a receiving pressure less than the second pressure. For example, receiving tank 252 is relatively depleted such that the second pressure is greater than the receiving pressure. Receiving valve 256 is opened, such as via a control system (not shown) on-board receiving spacecraft 102 that is in wireless communication with control system 270 and/or with a ground-based control system. In addition, control system 270 is programmed to open transfer valve 218, for example in response to the pressure in first variable volume 333 of transfer tank 310 reaching the second pressure. The higher second pressure in first variable volume 333 of transfer tank 310 causes a portion of the transfer quantity of supply gas to flow from first variable volume 333 of transfer tank 310, through transfer line 214 and receiving line 254, and into receiving tank 252. Transfer valve 218 and receiving valve 256 are closed after the transfer pressure and the receiving pressure are equalized. In the second phase, successive venting and transfer cycles may be repeated any number of times until the residual supply pressure in supply tank 208 is equal to or less than the lowest post-venting pressure in first variable volume 333 of transfer tank 310 that is achievable by venting second variable volume 335.

In alternative embodiments including supply tank 208 and bellows 434, the operations described above with respect to the first phase are omitted, and the supply gas is provided to receiving tank 252 using solely one or more cycles of the second phase process. In the example embodiment, supply tank 208 has a relatively large volume as compared to transfer tank 210. For example, the relatively smaller volume of transfer tank 210 enables bellows 434 to draw successive quantities of supply gas into transfer tank 210 and push each quantity out to receiving tank 252 in a more efficient process than pushing all of the supply gas directly from a large supply tank.

In some implementations, transfer system 150 again further includes heating system 222 operable by control system 270 as described above to heat first variable volume 333 of transfer tank 310 and/or the contents first variable volume 333 of transfer tank 310 such that the pressure of the quantity of supply gas within first variable volume 333 of transfer tank 310 is further increased to a greater second pressure and/or increased to the second pressure more efficiently, thereby further increasing the overall efficiency of the transfer process.

Transfer system 150 thus transfers supply gas from supply spacecraft 104 to receiving spacecraft 102 without requiring a use of electromechanical rotating equipment such as compressors or pumps that would require regular maintenance and/or significantly weight-increasing component redundancy to ensure operation in space. Because supply spacecraft 104 and receiving spacecraft 102 operate in outer space, beyond the easy reach of maintenance personnel and systems, a substantially maintenance free system, such as transfer system 150, ensures that supply spacecraft 104 can supply receiving spacecraft 102 reliably and at relatively low cost, and the reduced need for redundancy correspondingly reduces a weight of the supply spacecraft at launch.

FIG. 5 illustrates a flow chart of a method 500 of supplying receiving tank 252 of receiving spacecraft 102 with a supply gas. Method 500 includes coupling 502 second end 240 of transfer line 214 in flow communication with receiving tank 252. Transfer line 214 extends from first end 238 to second end 240. First end 238 is coupled to transfer tank 210 disposed on supply spacecraft 104. Transfer tank 210 holds a transfer quantity of the supply gas. Supply spacecraft 104 includes heating system 222 coupled in thermal communication with transfer tank 210 and transfer valve 218 operatively coupled to transfer line 214. Method 500 also includes activating 504 heating system 222 while transfer valve 218 is closed such that a pressure of the supply gas is increased. Method 500 further includes opening 506 transfer valve 218 such that a difference between the increased pressure of the supply gas in transfer tank 210 and a pressure in receiving tank 252 causes a portion of the transfer quantity of the supply gas to flow through transfer line 214 to receiving tank 252.

The above described embodiments of the systems described herein include a supply spacecraft for replenishing a gas supply of a receiving spacecraft in space. The supply spacecraft includes a transfer system configured to transfer a supply gas from the supply spacecraft to the receiving spacecraft using a limited amount of electro-mechanical equipment, thus reducing maintenance and redundancy requirements for the supply spacecraft. For example, the transfer system requires no rotating mechanical pumps or compressors. In a first implementation, the transfer system includes a transfer tank and a heating system that selectively heats the transfer tank, such that the heated supply gas is forced from the transfer tank into the receiving tank. In some such implementations, the transfer system also includes a cooling system that subsequently cools the transfer tank such that another quantity of supply gas is drawn from a supply tank into the transfer tank, for supply to the receiving tank in a subsequent heating cycle. Additionally or alternatively, the transfer system includes a working gas system and a variable volume transfer tank. The variable volume transfer tank includes a variable volume element that subdivides the tank into a working gas volume and a supply gas volume. The working gas system increases the pressure in the working gas volume of the transfer tank, causing the internal element to push supply gas from the supply gas side into the receiving tank. Specifically, the working gas system channels high pressure working gas into the working gas volume of the transfer tank, causing the variable volume element to force the supply gas out of the transfer tank into the receiving tank. In some such implementations, the variable volume element is a bellows, and the system is configured to cyclically vent the working gas side to cause the bellows to draw another quantity of supply gas from a supply tank into the supply gas volume of the transfer tank, before re-pressurizing the working gas side to push the supply gas out to the receiving tank. In other such implementations, the variable volume element is a bladder and the variable volume transfer tank is sized to resupply the receiving tank in a single push of the bladder by the working gas system. In a third implementation, the thermal transfer system is used in combination with the variable volume transfer tank to further increase the efficiency of the transfer process.

Each of the above described implementations transfers a supply gas from the supply spacecraft to the receiving spacecraft beyond an amount possible using simple tank pressure equalization, and does so without using rotating electro-mechanical equipment, such as pumps or compressors, thereby avoiding associated requirements for maintenance and redundancy.

Example technical effects of the methods, systems, and apparatus described herein include at least one of: (a) transferring a supply gas from a supply spacecraft to a receiving spacecraft; (b) increasing the pressure of a supply gas within a transfer tank using a heating system; (c) decreasing the pressure of a supply gas within a transfer tank using a cooling system to enable refilling the transfer tank from a supply tank; (d) increasing the pressure of a supply gas within a transfer tank using a working gas system; (e) venting a working gas side of a transfer tank to draw additional supply gas from a supply tank to the transfer tank for subsequent transfer; and (0 channeling a supply gas from a transfer tank to a receiving tank.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable dable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the embodiments described herein, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present disclosure or "an example embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of supplying a receiving tank of a receiving spacecraft with a supply gas, said method comprising:
    coupling a transfer line of a supply spacecraft in flow communication with the receiving tank on the receiving spacecraft, wherein the transfer line is coupled to a transfer tank disposed on the supply spacecraft, wherein the transfer tank holds a transfer quantity of the supply gas, wherein the supply spacecraft includes (i) a heating system coupled in thermal communication with the transfer tank and (ii) a transfer valve operatively coupled to the transfer line;
    activating the heating system while the transfer valve is closed such that a pressure of the transfer quantity of the supply gas is increased; and
    opening the transfer valve, wherein a difference between the increased pressure of the supply gas in the transfer tank and a pressure in the receiving tank causes a portion of the transfer quantity of the supply gas to flow through the transfer line to the receiving tank.

2. The method of claim 1, wherein a supply line is coupled in flow communication between the transfer tank and a supply tank disposed on the supply spacecraft, wherein the supply tank holds a supply quantity of the supply gas, and wherein a supply valve is operatively coupled to the supply line, wherein the receiving spacecraft includes a receiving line in flow communication between the transfer line and the receiving tank, wherein a receiving valve is operatively coupled to the receiving line, the method further comprising:
    prior to the step of activating the heating system, activating a cooling system while the transfer valve is closed, wherein the cooling system is coupled in thermal communication with the transfer tank such that a pressure of an initial quantity of supply gas in the transfer tank is decreased; and
    prior to the step of activating the heating system, opening the transfer valve and the supply valve and closing the receiving valve, wherein a difference between the decreased pressure of the supply gas in the transfer tank and a pressure in the supply tank causes a portion of the supply quantity of the supply gas to flow through the supply line and the transfer line to the transfer tank.

3. The method of claim 2, further comprising repeating the steps of activating the cooling system, opening the transfer valve and the supply valve to cause the supply gas to flow through the supply line and the transfer line to the transfer tank, activating the heating system, and opening the transfer valve to cause the supply gas to flow through the transfer line to the receiving tank.

4. The method of claim 2, wherein the cooling system is a radiative cooling system, the method further comprising rejecting heat from the initial quantity of supply gas into space with the radiative cooling system.

5. The method of claim 1, wherein the receiving spacecraft includes a receiving line in flow communication between the transfer line and the receiving tank, wherein a receiving valve is operatively coupled to the receiving line, wherein the transfer tank includes a variable volume element separating an interior of the transfer tank into a first variable volume and a second variable volume, the first variable volume holds the transfer quantity of the supply gas and the second variable volume is coupled in flow communication with a working gas tank by a working gas line, wherein the working gas tank holds a working gas, wherein a working gas valve is operatively coupled to the working gas line, the method further comprising opening the working gas valve, the transfer valve, and the receiving valve, wherein the working gas compresses the variable volume element and correspondingly further increases the pressure of the transfer quantity of the supply gas in the transfer tank such that a portion of the transfer quantity of the supply gas flows through the transfer line and the receiving line to the receiving tank.

6. The method of claim 5, wherein the variable volume element is a bladder, wherein the method further comprises supplying the portion of the transfer quantity of the supply gas from the transfer tank.

7. The method of claim 5, wherein the variable volume element is a bellows, wherein opening the working gas valve, the transfer valve, and the receiving valve comprises flowing the working gas into the second variable volume, wherein the working gas within the second variable volume compresses the bellows and correspondingly further increases the pressure of the transfer quantity of the supply gas in the transfer tank such that a portion of the transfer quantity of the supply gas flows through the transfer line and the receiving line to the receiving tank.

8. The method of claim 7, wherein a supply line is coupled in flow communication between the transfer tank and a supply tank disposed on the supply spacecraft, wherein the supply tank holds a supply quantity of the supply gas, and wherein a supply valve is operatively coupled to the supply line, the method further comprising:
prior to the step of opening the working gas valve, venting the second variable volume and opening the transfer valve and the supply valve, such that the bellows is pushed into an expanded volume condition by a pressure in the supply tank being higher than the pressure of the transfer quantity of the supply gas in the transfer tank such that a portion of the supply quantity of the supply gas into the first variable volume.

9. The method of claim 1, wherein a supply line is coupled in flow communication between the transfer tank and a supply tank disposed on the supply spacecraft, wherein the supply tank holds a supply quantity of the supply gas, and wherein a supply valve is operatively coupled to the supply line, the method further comprising:
closing the transfer valve such that supply gas is prevented from flowing into the transfer tank; and
opening the supply valve, wherein a difference between a pressure of the supply gas in the supply tank and a pressure in the receiving tank causes a portion of the supply quantity of the supply gas to flow through the supply line and to the receiving tank.

10. The method of claim 9, wherein the receiving spacecraft includes a receiving line in flow communication between the transfer line and the receiving tank, wherein a receiving valve is operatively coupled to the receiving line, the method further comprising opening the receiving valve, wherein the portion of the supply quantity of the supply gas flows through the receiving line and to the receiving tank.

11. The method of claim 1, wherein the heating system comprises an electric heating system.

12. The method of claim 1, wherein a supply line is coupled in flow communication between the transfer tank and a supply tank disposed on the supply spacecraft, wherein the supply tank holds a supply quantity of the supply gas, and wherein a supply valve is operatively coupled to the supply line, wherein the method further comprises, prior to the step of activating the heating system, opening the transfer valve and the supply valve, wherein a difference between the decreased pressure of the supply gas in the transfer tank and a pressure in the supply tank causes a portion of the supply quantity of the supply gas to flow through the supply line and the transfer line to the transfer tank.

13. The method of claim 1, wherein the receiving spacecraft includes a receiving line in flow communication between the transfer line and the receiving tank, wherein a receiving valve is operatively coupled to the receiving line, wherein opening the transfer valve comprises opening the transfer valve and the receiving valve, wherein a difference between the increased pressure of the supply gas in the transfer tank and a pressure in the receiving tank causes a portion of the transfer quantity of the supply gas to flow through the transfer line to the receiving tank.

14. The method of claim 1, further comprising, prior to the step of activating the heating system, activating a cooling system while the transfer valve is closed, wherein the cooling system is coupled in thermal communication with the transfer tank such that a pressure of an initial quantity of supply gas in the transfer tank is decreased.

15. The method of claim 14, wherein the cooling system is a radiative cooling system, the method further comprising rejecting heat from the initial quantity of supply gas into space with the radiative cooling system.

16. The method of claim 1, wherein the transfer tank includes a variable volume element separating an interior of the transfer tank into a first variable volume and a second variable volume, the first variable volume holds the transfer quantity of the supply gas and the second variable volume is coupled in flow communication with a working gas tank by a working gas line, wherein the working gas tank holds a working gas, wherein a working gas valve is operatively coupled to the working gas line, the method further comprising opening the working gas valve and the transfer valve, wherein the working gas compresses the variable volume element and correspondingly further increases the pressure of the transfer quantity of the supply gas in the transfer tank such that a portion of the transfer quantity of the supply gas flows through the transfer line and a receiving line to the receiving tank.

17. The method of claim 16, wherein the variable volume element is a bladder.

18. The method of claim 16, wherein the variable volume element is a bellows.

19. The method of claim 18, wherein a supply line is coupled in flow communication between the transfer tank and a supply tank disposed on the supply spacecraft, wherein the supply tank holds a supply quantity of the supply gas, and wherein a supply valve is operatively coupled to the supply line, the method further comprising:
prior to the step of opening the working gas valve and the transfer valve, venting the second variable volume and opening the transfer valve and the supply valve, such that the bellows is pushed into an expanded volume condition by a pressure in the supply tank being higher than the pressure of the transfer quantity of the supply gas in the transfer tank such that a portion of the supply quantity of the supply gas into the first variable volume.

20. The method of claim 1, wherein the supply spacecraft comprises a control system operatively coupled to the transfer valve and the heating system, wherein activating the heating system comprises activating the heating system using the control system, and wherein opening the transfer valve comprises opening the transfer valve using the control system.

* * * * *